United States Patent
Park et al.

(10) Patent No.: US 9,417,386 B2
(45) Date of Patent: Aug. 16, 2016

(54) PLASMONIC OPTICAL WAVEGUIDE USING PLASMONIC COUPLING BETWEEN NANO-APERTURE AND NANO-PARTICLE

(71) Applicant: INDUSTRY-ACADEMIC COOPERATION FOUNDATION YONSEI UNIVERSITY, Seoul (KR)

(72) Inventors: No Cheol Park, Seoul (KR); Won Sup Lee, Seoul (KR); Do Hyung Kim, Goyang-si (KR); Hyungbae Moon, Seoul (KR); Guk Jong Choi, Seoul (KR); Sungbin Jeon, Seoul (KR); Geon Lim, Seoul (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/696,046

(22) Filed: Apr. 24, 2015

(65) Prior Publication Data
US 2015/0331185 A1    Nov. 19, 2015

(30) Foreign Application Priority Data

Apr. 25, 2014  (KR) .................. 10-2014-0050075

(51) Int. Cl.
G02B 6/122  (2006.01)
G02B 6/10   (2006.01)
(Continued)

(52) U.S. Cl.
CPC .............. *G02B 6/1226* (2013.01); *G02B 6/107* (2013.01); *H01S 3/063* (2013.01); *H01S 3/169* (2013.01); *B82Y 20/00* (2013.01); *Y10S 977/773* (2013.01)

(58) Field of Classification Search
CPC ....... G02B 6/1226; G02B 6/107; B82Y 20/00
See application file for complete search history.

(56) References Cited

U.S. PATENT DOCUMENTS 5,973,316 A  * 10/1999  Ebbesen ............... B82Y 20/00
                                                   250/216
6,621,575 B1 *  9/2003  Beuthan ............... G01N 21/251
                                                   356/318
(Continued)

FOREIGN PATENT DOCUMENTS

CN     102565024 A     7/2012
JP     2010-026331 A   2/2010
KR     10-2011-0056799 A  5/2011

OTHER PUBLICATIONS

Dihan Hasan et al., "Enhanced Localized Surface Plasmonic Resonances in Dielectric Photonic Band-Gap Structures: Fabry-Perot Nannocavities & Photonic Crystal Slot Waveguides", Proc. of SPIE vol. 8632, Apr. 2013.
(Continued)

*Primary Examiner* — Eric Bolda
(74) *Attorney, Agent, or Firm* — LRK Patent Law Firm

(57) ABSTRACT

The present invention relates to a plasmonic optical waveguide using plasmonic coupling between a nano-aperture and a nano-particle. The plasmonic optical waveguide includes the nano-aperture formed with an opening of a nano-scale through which light enters; and a single metal nano-particle arranged at the focal point of the nano-aperture to generate plasmon coupling in association with the light output from the nano-aperture. The plasmonic optical waveguide has an effect of forming a small and strong high-intensity high-density light spot of a sub-wavelength size, in which an amplification rate is increased at the output surface of the nano-particle more than a few hundred times compared with the incident light, since the light is transmitted by plasmon coupling generated between the nano-aperture and the nano-particle.

6 Claims, 8 Drawing Sheets

(51) Int. Cl.
   *B82Y 20/00*    (2011.01)
   *H01S 3/063*    (2006.01)
   *H01S 3/16*     (2006.01)

(56) References Cited

U.S. PATENT DOCUMENTS

2007/0153267 A1\* 7/2007 Wang .................. G01N 21/658
                                                    356/301

2011/0055984 A1\* 3/2011 Cheng .................. B82Y 20/00
                                                    850/32

OTHER PUBLICATIONS

Nathan C. Lindquist et al., "Plasmonic nanofocusing with a metallic pyramid and an integrated C-shaped aperture", Scientific Reports, 3:1857, May 16, 2013.

\* cited by examiner (a)

(b)

(a)

(b)

(c)

PLASMONIC OPTICAL WAVEGUIDE USING PLASMONIC COUPLING BETWEEN NANO-APERTURE AND NANO-PARTICLE

BACKGROUND OF THE INVENTION

1. Field of the Invention

The present invention relates to a plasmonic optical waveguide using plasmonic coupling between a nano-aperture and a nano-particle, and more specifically, to a plasmonic optical waveguide which can amplify light output from a nano-aperture by transmitting the light without loss through a nano-particle using plasmonic coupling.

2. Background of the Related Art

High-intensity light of a small size is needed in many fields such as an optical information storage device, a near field scanning optical microscopy (NSOM), lithography and the like. A general method used for generating the small and strong high-intensity light is refracting incident light using a lens. At this point, the minimum size of an output beam cannot be smaller than a diffraction limit Δ of light as shown in the following equation.

$$\Delta = \frac{\lambda}{2n\sin(\theta)} = \frac{\lambda}{2NA}$$

In the above equation, Δ denotes a diffraction limit, λ denotes wavelength of light, n denotes a refractive index of a medium, θ denotes an incident angle, and NA denotes the number of openings.

Generally, an immersion lens may be used as a method for reducing the size of a light spot. Since the immersion lens may obtain the number of openings NA larger than one by increasing the refractive index of a medium, it may obtain a diffraction limit small than λ/2. However, although it is possible to secure an NA larger than one by using an immersion material, a resolution of a few tens of nanometers, which is needed for a microscope, a semiconductor or the like, is difficult to obtain since the refractive index is limited. Nano-opening is an outcome of a study which has been conducted to generate an output beam smaller than this. The nano-opening is a hole drilled in a metal thin film to be smaller than the wavelength of light, and if light enters the nano-opening, the path of the light is blocked by the metal thin film, and thus only the light smaller than the size of the nano-opening is transmitted. However, since the amount of the transmitted light is limited, there is a problem in that intensity of the output beam is low. To solve this problem, shapes of the nano-opening using surface plasmon resonance (SPR) are studied.

As a conventional prior technique related to the shape of a nano-opening, a nano-opening of a peculiar shape for amplifying intensity of incident light is disclosed in US Patent Publication No. 2008-0151360. However, since the conventional optical amplification technique based on the nano-opening accomplishes the optical amplification through surface plasmon resonance by using only a peculiar geometric shape of the nano-opening, there is a limit in obtaining an output light having a high optical amplification rate and a very small collected light compared with the incident light. Accordingly, it is disadvantageous in that it is difficult to obtain high-intensity and high-density output optical energy needed for the optical information storage device, the near field scanning optical microscopy (NSOM), the lithography and the like.

In addition, since the nano-opening should approach a sample (medium) at a gap of a few tens of nanometers to demonstrate performance of the nano-opening, it is disadvantageous in that the nano-opening is exposed to damage and contamination. Accordingly, it is disadvantageous in that if a dielectric layer is arranged on the bottom surface of the nano-opening, performance of the nano-opening is seriously lowered, and if the dielectric layer is not arranged, the nano-opening is highly probable to be damaged and contaminated since it is exposed to use environments as is.

Although a method of primarily amplifying light at the nano-opening and secondarily re-amplifying the light between metal nano-particles using a multi-surface plasmon resonance effect has been introduced to solve the problems, there is a problem in that since this method is sensitive to arrangement of nano-particles, light can be emitted when an error of a few nanometers occur at the gap between the particles.

SUMMARY OF THE INVENTION

Therefore, the present invention has been made in view of the above problems, and it is an object of the present invention to provide a plasmonic optical waveguide using plasmonic coupling between a nano-aperture and a nano-particle, in which a small and strong high-intensity light spot is formed by secondarily collecting light, which is primarily amplified at the nano-aperture, by a nano-particle placed near the focal point.

To accomplish the above object, according to one aspect of the present invention, there is provided a plasmonic optical waveguide including: a nano-aperture formed with an opening of a nano-scale on one side to pass light; and a metal nano-particle positioned on the one side on which the opening is formed and positioned at or near a focal point of the nano-aperture to generate plasmon coupling by interacting with the nano-aperture.

The metal nano-particle may be positioned to contact with the one side on which the opening is formed.

The metal nano-particle may be positioned across an area in which the opening is formed and the other area of the one side.

The opening may have a ridge, and the metal nano-particle may be positioned on an imaginary line extended from the ridge.

The plasmonic optical waveguide may further include a fixing means for fixing the metal nano-particle.

Here, one end of the fixing means may be connected to the one side of the nano-aperture, and the other end may be connected to the metal nano-particle.

The fixing means may include a dielectric layer formed on the one side of the nano-aperture, and the metal nano-particle may be buried and fixed in the dielectric layer.

According to another aspect of the present invention, there is provided a plasmonic optical waveguide including: a nano-aperture formed with an opening of a nano-scale created by a light spot on one side; a metal nano-particle positioned on the one side on which the opening is formed and positioned at a position where the light spot of the nano-aperture is generated to generate plasmon coupling by interacting with the nano-aperture; and a fixing means formed on the one side of the nano-aperture to fix the metal nano-particle.

Here, the fixing means may be an insulation layer coated on the one side, and the metal nano-particle may be buried in the insulation layer.

According to still another aspect of the present invention, there is provided a plasmonic optical amplification method including the steps of: putting light into an opening of a nano-scale formed at a nano-aperture; transferring energy from the nano-aperture to a metal nano-particle by the light put into the nano-aperture, through plasmon coupling generated by interaction between the nano-aperture and the metal nano-particle arranged at or near a focal point of the nano-aperture; and forming a light spot at the metal nano-particle by the transferred energy.

A plasmonic optical waveguide according to still another aspect of the present invention may include: a nano-aperture formed with an opening of a nano-scale through which light enters; a dielectric layer coupled to the surface of the nano-aperture to protect the nano-aperture; and a single metal nano-particle arranged at the focal point of the nano-aperture to generate plasmon coupling in association with the light output from the nano-aperture.

To accomplish the above object, according to still another aspect of the present invention, there is provided an optical information storage device using a plasmonic optical waveguide, and the plasmonic optical waveguide includes: a nano-aperture formed with an opening of a nano-scale through which light enters; a dielectric layer coupled to the surface of the nano-aperture to protect the nano-aperture; and a single metal nano-particle arranged at the focal point of the nano-aperture to generate plasmon coupling in association with the light output from the nano-aperture.

Meanwhile, to accomplish the above object, according to still another aspect of the present invention, there is provided an optical amplification method using a plasmonic optical waveguide, the method including the steps of: putting light into an opening of a nano-scale formed at a nano-aperture; generating plasmon coupling by the light output from the nano-aperture 100 and a single metal nano-particle arranged at the focal point of the nano-aperture; and forming a light spot by transferring the energy generated by the nano-aperture to the metal nano-particle.

BRIEF DESCRIPTION THE DRAWINGS

DETAILED DESCRIPTION OF TER PREFERRED EMBODIMENT

Figure 1:
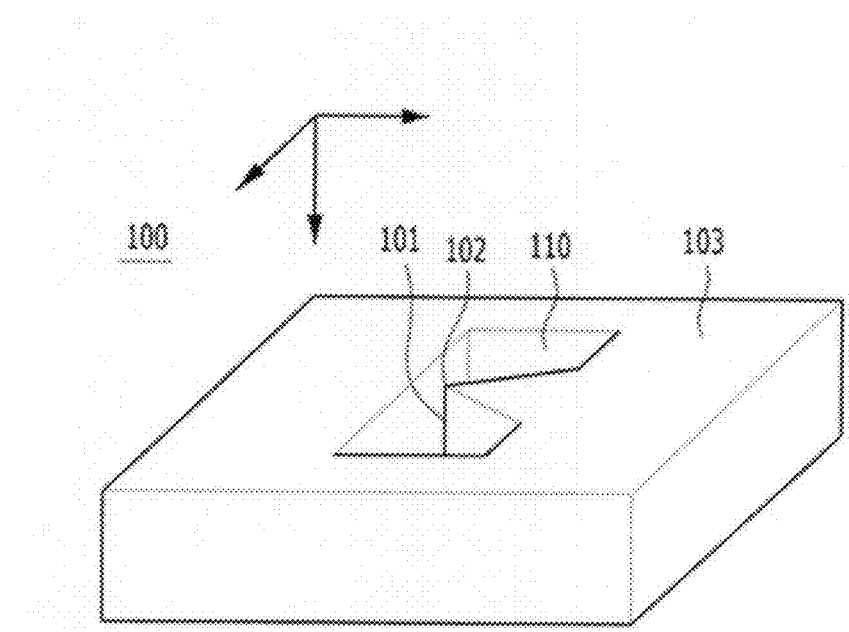
FIG. 1 is a perspective view showing a triangular nano-aperture.

Although the preferred embodiments of the present invention will be hereafter described in detail with reference to the accompanying drawings, the scope of the present invention is not limited thereto. Detailed description will be omitted for publicized configurations, and in addition, if a configuration may make the spirit of the present invention unclear, detailed description thereof will be omitted.

A plasmonic optical waveguide of the present invention is a module capable of amplifying an optical signal, which is a kind of electromagnetic wave, to have a high amplification rate compared with incident light and may be configured to include a nano-aperture 100 formed with an opening 110 of a nano-scale and a metal nano-particle. In addition, it may be configured to additionally include a dielectric layer 200 combined at the outlet side of the nano-aperture 100.

The nano-aperture 100 may be a kind of optical element. The nano-aperture 100 may form a light spot by using surface plasmon (SP) occurring on the surface of a metallic material, unlike a lens optical system which collects light by means of refraction between materials. The opening 110 may be formed in the nano-aperture 100, and the opening 110 may be formed in a shape connecting one side 103 of the nano-aperture 100 to the other side opposite of to one side 103 so that light may pass through. A ridge 10 may be formed in the opening 110. The nano-aperture 100 is formed of a metal layer 120 of high conductivity which may generate plasmon excitations. For example, it may include at least any one selected among Cu, Al, Ni, ruthenium (Ru), rhodium (Rh), palladium (Pd), silver (Ag), osmium (Os), iridium (Ir), platinum (Pt) and gold (Au). In addition, it may be formed of an alloy including any one of these. In addition, it is not limited thereto and may employ other various kinds of metals including all precious metallic materials.

In addition, the nano-aperture 100 may be formed of one metal layer 120 or a plurality of metal layers 120.

Although the nano-aperture 100 may be configured in a variety of shapes such as a C-shape, an H-shape, a Bowti-shape and the like, it is possible to improve optical output power by applying a triangular nano-aperture 100 which can generate a high intensity beam output of strong energy and is easy to fabricate.

It is known that when light passes through the opening 110 formed in the metal layer 120, the transmitted light forms a near field having a beam spot smaller than the diffraction limit of the incident light, and intensity of the transmitted light increases very high. This phenomenon is referred to as near field enhancement, and this is generally understood to be caused by surface plasmon resonance occurring on the surface of a metal thin film configuring the opening.

Although thickness of the dielectric layer 200 may be configured diversely, it is preferably the same as the diameter of the metal nano-particle 300 so that the metal nano-particle 300 is in a state of being buried in the dielectric layer 200 when it is seen from the side.

Since the metal nano-particle 300 is buried in the dielectric layer 200, it is possible to prevent decrease of light intensity, which may occur otherwise, when the light spot formed through the metal nano-particle 300 passes through the dielectric layer 200 again.

Since the metal nano-particle 300 is buried in the dielectric layer 200, there is an effect of fixing the metal nano-particle 300 to the focal point of the nano-aperture 100.

The position of the focal point of the nano-aperture 100 may be a point on which the light spot of the nano-aperture 100 is formed. The light spot of the nano-aperture 100 may be formed at the ridge tip 102 of the opening 110, and this point may be the focal point of the nano-aperture 100. Here, the ridge 101 may be a portion formed to be sharply extended from the opening 110 along the Z-axis direction, and the ridge tip 102 may be an end point of the ridge 101, i.e., a point where the ridge 101 meets one side 103 of the nano-aperture 100.

At this point, it is preferable that if the size of the metal nano-particle 300 increases, thickness of the dielectric layer 200 is also increased in proportional to this.

In addition, the dielectric layer 200 may employ $SiO_2$ or other various materials having a property similar to this.

In addition, the dielectric layer 200 performs a function of preventing abrasion or contamination of the nano-aperture 100 caused by continuous beam forming.

In addition, a variety of shapes such as a cylindrical shape, a cubic shape, a rectangular parallelepiped shape, a spherical shape, a semi-spherical shape, a cone shape, a triangular pyramid shape, a triangular prism shape, a quadrangular pyramid shape and the like may be applied as the geometric shape of the metal nano-particles 300 formed in the dielectric layer 200.

In addition, a variety of metallic materials such as gold, silver, copper, aluminum, bronze and the like may be applied as a material of the metal nano-particles 300.

Describing an optical amplification method using a plasmonic optical waveguide of the present invention having such a configuration, the method includes the steps of putting light into the opening 110 of a nano-scale formed at the nano-aperture 100; generating plasmon coupling by the light output from the nano-aperture 100 and a single metal nano-particle 300 arranged at the focal point of the nano-aperture 100; and forming a light spot by transferring the energy generated by the nano-aperture 100 to the metal nano-particle 300.

Hereinafter, a preferred embodiment of the present invention will be described in detail with reference to accompanying drawings.

FIG. 1 is a perspective view showing a triangular nano-aperture 100. The triangular nano-aperture 100 has a shape in which a triangular ridge is protruded in a rectangular hole in order to use local surface plasmon resonance. If an electromagnetic field enters, excited electrons are accumulated at the corner of the triangular ridge, i.e., the ridge 101, and thus the nano-aperture 100 may have high electromagnetic field intensity. Therefore, a maximum electromagnetic field amplification rate is obtained at the ridge 101, which is a structure easy to accumulate electrons. FIGS. 2(a) to 2(c) show front views and side views of the triangular nano-aperture 100. FIG. 2(a) shows a case where the metal nano-particle 300 exists at a position corresponding to the focal point of the nano-aperture 100, FIG. 2(b) shows a case where the metal nano-particle 300 exists at a position corresponding to the focal point of the nano-aperture 100 and, at the same time, a dielectric layer 200 having a thickness the same as the diameter of the metal nano-particle 300 exists, and FIG. 2(c) shows a case where both the dielectric layer 200 and the metal nano-particle 300 do not exist.

Figure 2:
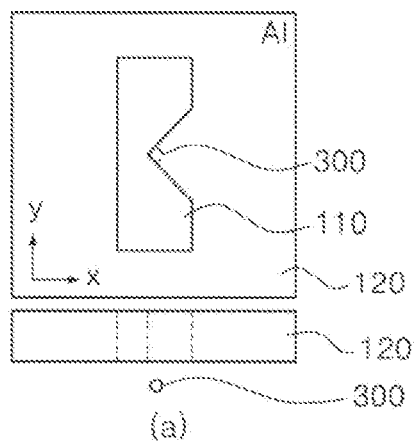
FIG. 2 shows front views and side views of the triangular nano-aperture.
Figure 2:
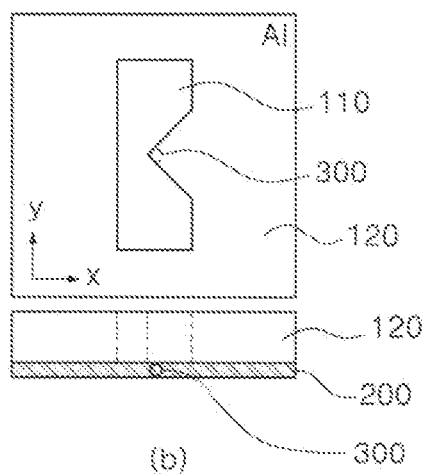
Figure 2:
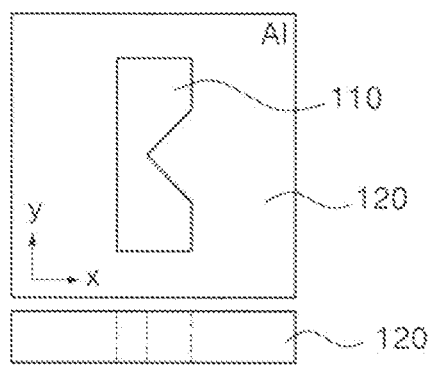

Meanwhile, although the metal nano-particle 300 may be arranged to contact with two corners of the triangular edge of the triangular nano-aperture 100 as shown in FIG. 2, it may be arranged to place the center of the metal nano-particle 300 at the intersection point of the two corners.

Figure 3:
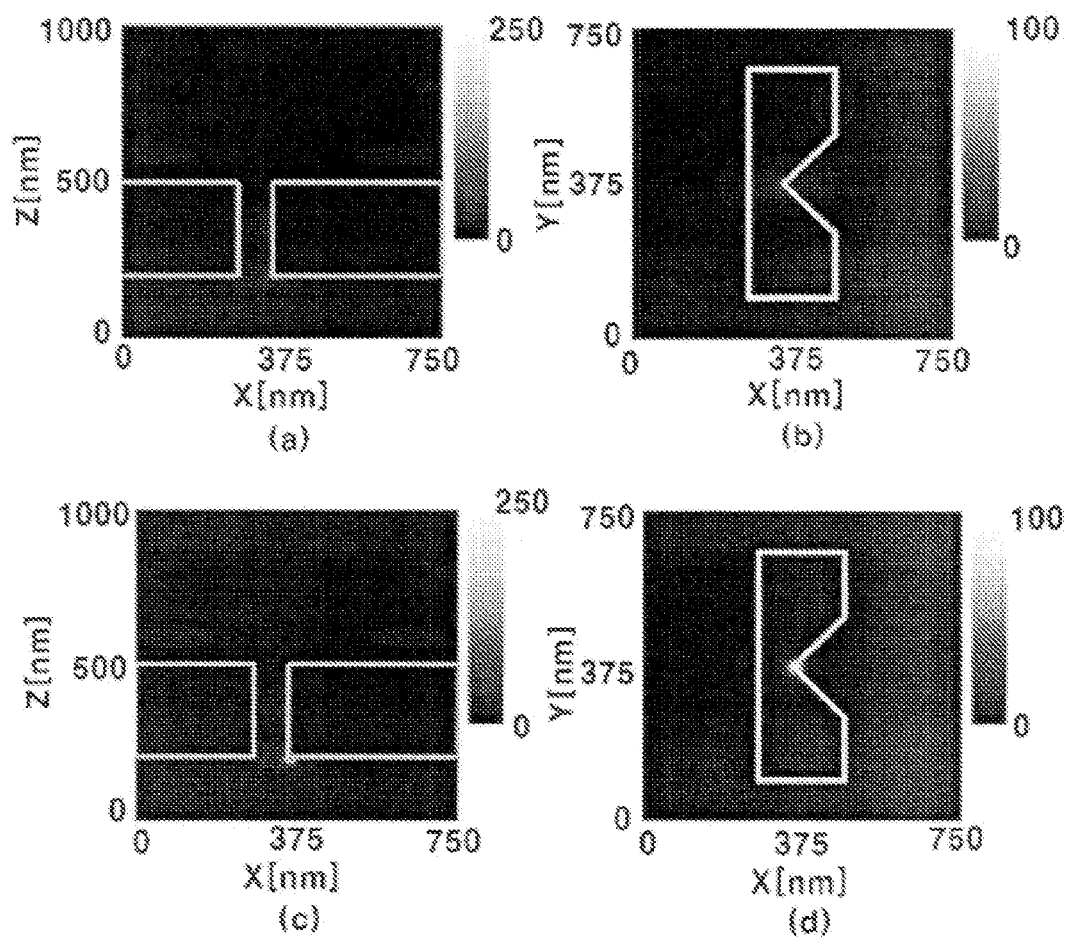
FIG. 3 is a simulation view showing a light spot formed by the plasmonic optical waveguide of the present invention on the X-Y plane and the X-Z plane, respectively.

FIG. 3 is a simulation view showing a light spot formed by the plasmonic optical waveguide of the present invention on the X-Y plane and the X-Z plane, respectively. FIG. 3 shows a result of a simulation conducted to observe only the effect of the metal nano-particle when the dielectric layer 200 does not exist. FIGS. 3(a) and 3(b) show a light spot simulation conducted when the metal nano-particle 300 does not exist, and FIGS. 3(c) and 3(d) show a light spot simulation conducted when the metal nano-particle 300 exists. The full width at half maximum (FWHM) is calculated as 32 nm×44 nm in the case of FIGS. 3(a) and 3(b), whereas the full width at half maximum (FWHM) is calculated as 18 nm×18 nm in the case of FIGS. 3(c) and 3(d). That is, it may be understood that a strong light collection effect is observed at the corners when the metal nano-particle 300 exists on both the X-Y plane and the X-Z plane, rather than when the metal nano-particle 300 does not exist.

Figure 4:
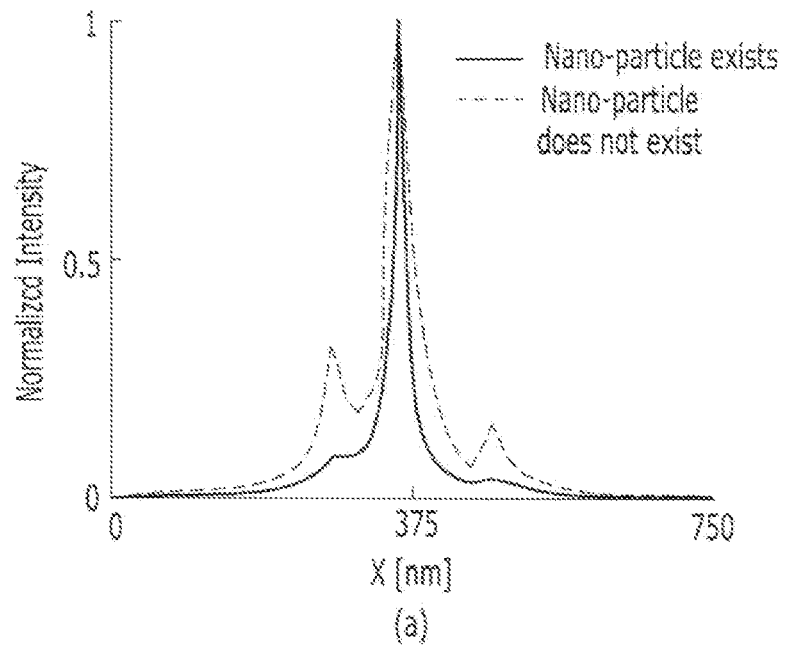
FIG. 4 shows X-axis and Y-axis graphs comparing light spot sizes according to existence of a nano-particle in the plasmonic optical waveguide when the dielectric layer of the present invention does not exist.
Figure 4:
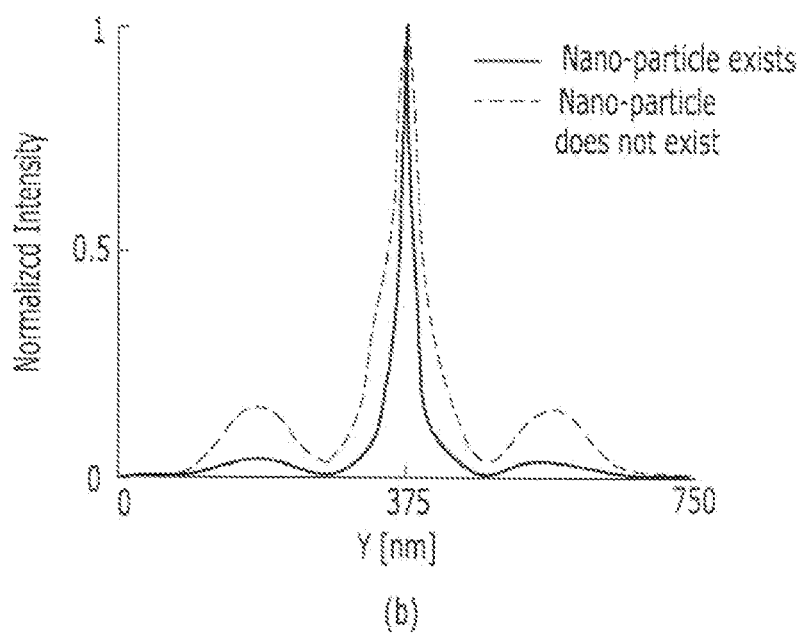

Describing the optical profile on the X and Y cross sections focusing on the corner of the triangular nano-aperture 100 with reference to FIGS. 4(a) and 4(b), it is understood in both cases that high intensity of the output beam is shown at the corner, and as it goes farther from the corner, intensity of the output beam is weakened. In addition, the solid line is a graph showing a case in which the metal nano-particle 300 exists, whereas the dotted line is a graph showing only the effect of the nano-aperture 100 when the metal nano-particle 300 does not exist. In summary, in both cases of X and Y cross sections, it can be confirmed that a further intensified light collection phenomenon is shown since the full width at half maximum (FWHM) is smaller when the metal nano-particle 300 exists, rather than when the metal nano-particle 300 does not exist.

Figure 5:
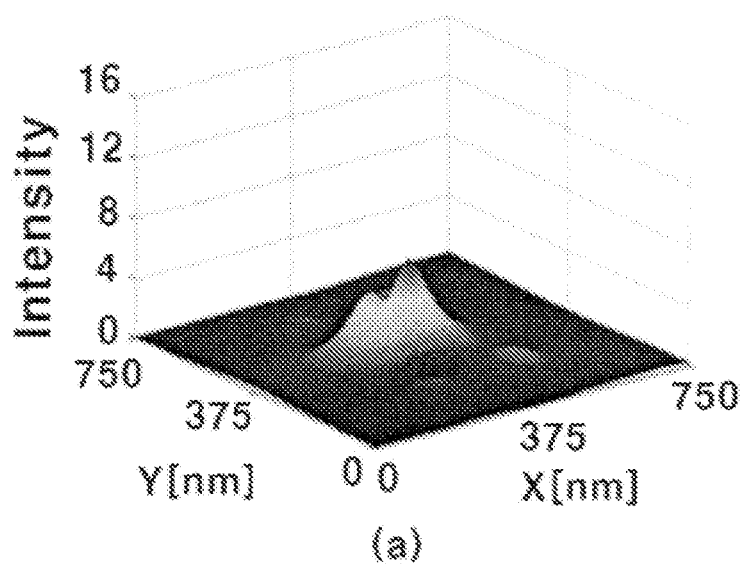
FIG. 5 shows X-Y plane graphs comparing light intensity performance according to existence of a nano-particle in the plasmonic optical waveguide when the dielectric layer of the present invention exists.
Figure 5:
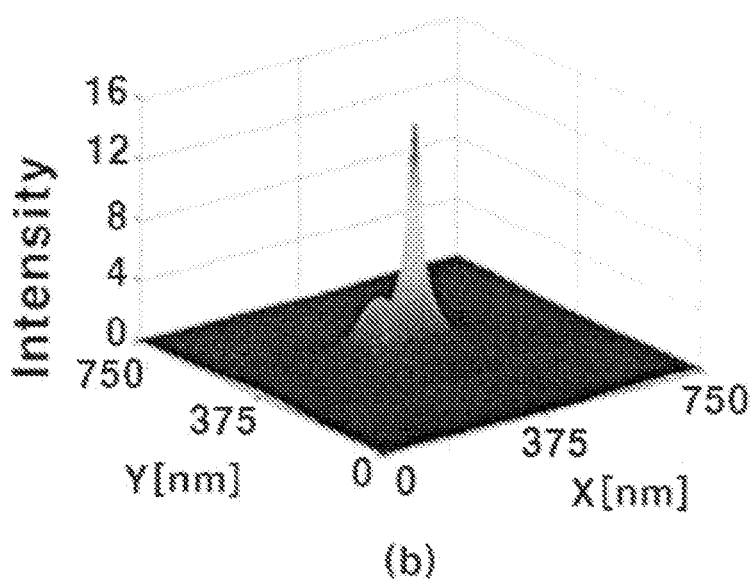

In addition, FIGS. 5(a) and 5(b) show, when the dielectric layer 200 exists, light intensity on the X-Y plane when the metal nano-particle 300 exists (FIG. 5(a)) and when the metal nano-particle 300 does not exist (FIG. 5(b)). The full width at half maximum (FWHM) is calculated as 32 nm×30 nm when the metal nano-particle 300 exists, whereas the full width at half maximum (FWHM) is calculated as 166 nm×86 nm when the metal nano-particle 300 does not exist. That is, a light spot of high-intensity and high-density is formed by the light surface plasmon resonance when the metal nano-particle exists, rather than when metal nano-particle does not exist.

Figure 6:
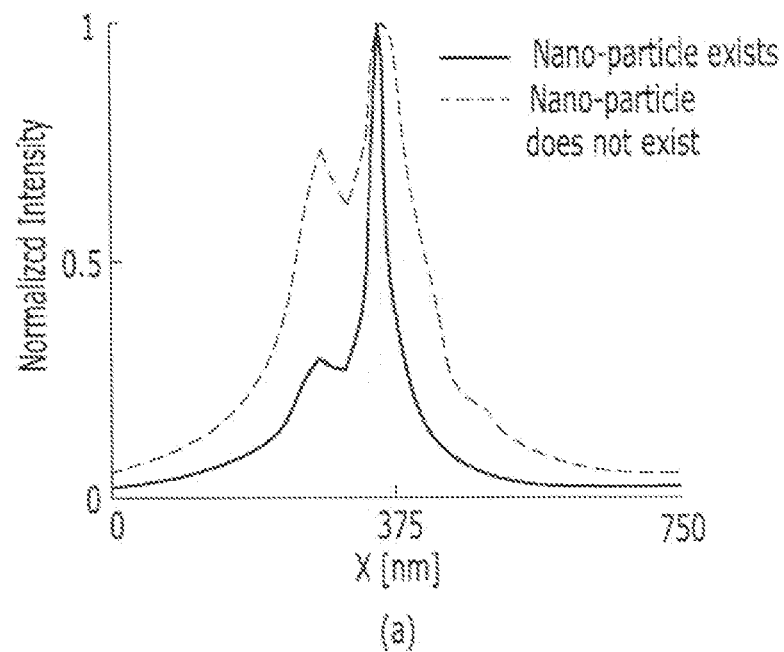
FIG. 6 shows X-axis and Y-axis graphs comparing light spot sizes according to existence of a nano-particle in the plasmonic optical waveguide when the dielectric layer of the present invention exists.
Figure 6:
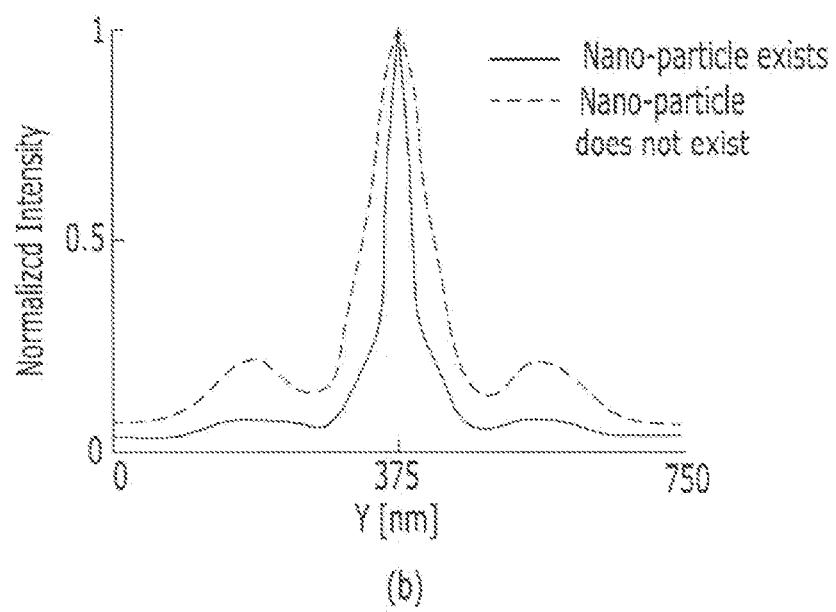

In addition, FIG. 6 shows light spot sizes as graphs of an X-axis direction and a Y-axis direction when the dielectric layer 200 exists. The solid line is a graph showing a case in which the metal nano-particle 300 exists, whereas the dotted line is a graph showing only the effect of the nano-aperture 100 when the metal nano-particle 300 does not exist. It can be confirmed that a strong optical amplification effect is shown since the full width at half maximum (FWHM) is smaller when the metal nano-particle 300 exists, rather than when the metal nano-particle 300 does not exist.

Figure 7:
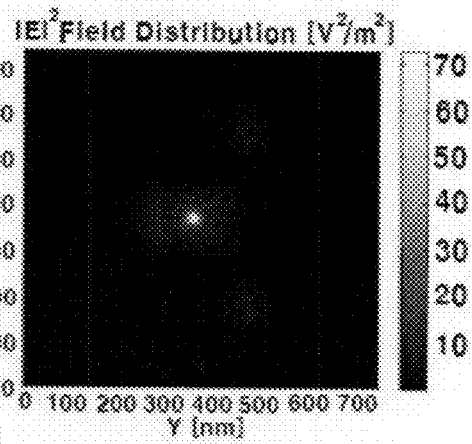
FIG. 7 is a simulation view showing a light spot formed by the plasmonic optical waveguide according to the nano-particle size on the X-Y plane.
Figure 7:
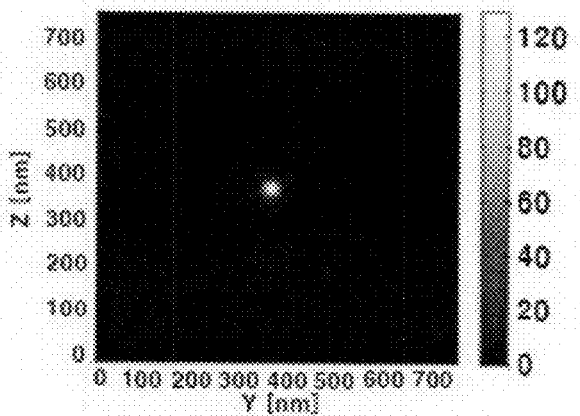
Figure 7:
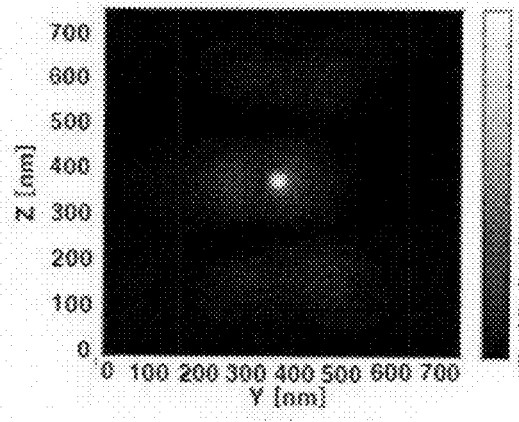
Figure 8:
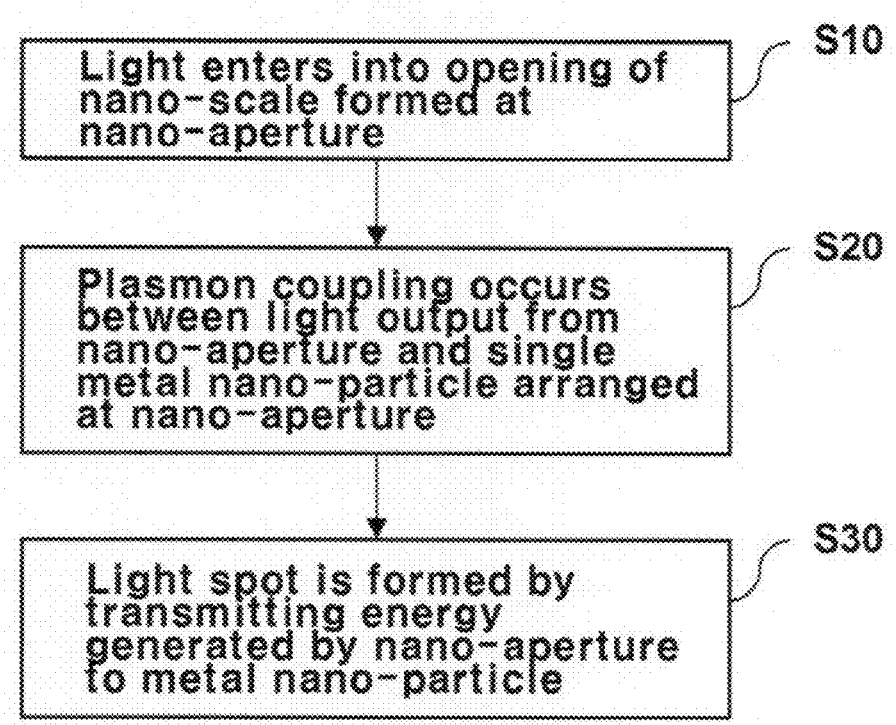
FIG. 8 is a flowchart illustrating an optical amplification method using a plasmonic optical waveguide.

In addition, FIG. 7 shows views of a light spot formed by plasmonic coupling at the nano-particle 300 on the X-Y plane while increasing the size of the nano-particle 300 from 10 nm to 30 nm by 10 nm. FIG. 7(a) shows a case in which the diameter of the nano-particle is 10 nm, and the full width at half maximum (FWHM) is calculated as 18 nm×18 nm. FIG. 7(b) shows a case in which the diameter of the nano-particle is 20 nm, and the full width at half maximum (FWHM) is calculated as 22 nm×22 nm. FIG. 7(c) shows a case in which the diameter of the nano-particle is 30 nm, and the full width at half maximum (FWHM) is measured as 30 nm×30 nm. In the case of an invention using a nano-particle array, the amplification effect can be shown only by precisely arranging the nano-particle array since the light spot is generated by using plasmon resonance occurring in the gap between the nano-particles 300, whereas the present invention may show a transmission effect by arranging a single nano-particle 300 at the focal point.

As described above, the present invention may form a small and strong high-intensity high-density light spot of a sub-wavelength size in the hybrid optical waveguide, which has an amplification rate increased more than a few hundred times compared with incident light, by using plasmon coupling which primarily amplifies the light entered through the nano-opening 110 of the nano-aperture 100 at the ridge corner of the nano-opening 110 and then secondarily re-amplifies the light on the surface of the metal nano-particle 300 formed at the focal point of the nano-aperture 100.

Meanwhile, an optical amplifier having an excellent optical amplification efficiency can be manufactured by applying the principle of creating a high-intensity light spot by using the hybrid optical waveguide of the present invention described above. A general optical amplifier performing optical amplification using an optical waveguide induces an incident optical signal through the optical waveguide and, at the same time, outputs a signal amplified to a predetermined level, and the amplification rate of the output light can be enhanced with respect to the incident light by using the optical waveguide used for the optical amplifier as the hybrid optical waveguide configured of the nano-aperture 100 formed with the nano-opening 110 and the dielectric layer 200 formed with the metal nano-particle 300 as described above.

In addition, the hybrid optical waveguide module structure of the present invention described above may be applied to a high-density near field optical information storage device having a high-density recording capacity and a high resolution. The high-density near field optical information storage device applying the hybrid optical waveguide module may obtain an information storing and recording capability remarkably improved compared with an existing data recording density.

In addition, the hybrid optical waveguide module of the present invention may be applied to a Heat Assisted Magnetic Recording device which can easily magnetize a magnetic recording medium by dropping a coercive force by locally applying heat to the magnetic recording medium. Such a Heat Assisted Magnetic Recording device to which the hybrid optical waveguide module is applied may obtain an information storing and recording capability remarkably improved compared with an existing data recording density.

In addition, the hybrid optical waveguide module of the present invention may be applied to a Maskless Nano lithography system which does not use a mask. Since such a Maskless Nano lithography to which the hybrid optical waveguide module is applied may implement a line width of a sub-wavelength size through a double amplification mechanism of electromagnetic waves, basic technologies for increasing an integration degree of a semiconductor chip can be developed.

In addition, the hybrid optical waveguide of the present invention may be applied to a laser processing device, and such a laser processing device to which the hybrid optical waveguide module is applied may implement an excellent processing capability owing to excellent optical amplification efficiency and a light spot of a sub-wavelength size, and it is advantageous in that the overall system can be simplified and manufactured at a low price.

According to the present invention having a configuration as described above, since light is transmitted as the light amplified through a nano-aperture generates plasmon coupling in association with a single nano-particle, the single nano-particle only needs to be placed near the focal point of the nano-aperture, and thus it is not sensitive to an allowance and an error of a gap.

In addition, since light is transmitted by the plasmon coupling generated between the nano-aperture and the nano-particle, a small and strong high-intensity high-density light spot of a sub-wavelength size, in which an amplification rate is increased more than a few hundred times compared with the incident light, may be formed at the output surface of the nano-particle.

In addition, the possibility of damaging or contaminating the nano-opening is reduced by manufacturing a protection layer including a nano-particle.

In addition, when the plasmonic optical waveguide of the present invention is applied to a high-density near field optical information storage device or a Heat Assisted Magnetic Recording device, it may obtain an information storing and recording capability remarkably improved compared with an existing data recording density. In addition, when the plasmonic optical waveguide is applied to nano-lithography, it may develop techniques for increasing an integration degree of a semiconductor chip.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A plasmonic optical waveguide comprising:
   a nano-aperture formed with an opening of a nano-scale on one side to pass light; and
   a metal nano-particle positioned on the one side on which the opening is formed and positioned at or near a focal point of the nano-aperture to generate plasmon coupling by interacting with the nano-aperture,
   wherein the position of the focal point of the nano-aperture is formed at the ridge tip of the opening, and the ridge tip is a point where the ridge meets one side of the nano-aperture, and
   a fixing means for fixing the metal nano-particle,
   wherein one end of the fixing means is connected to the one side of the nano-aperture, and the other end is connected to the metal nano-particle.

2. The plasmonic optical waveguide according to claim 1, wherein the metal nano-particle is positioned to contact with the one side on which the opening is formed.

3. The plasmonic optical waveguide according to claim 1, wherein the metal nano-particle is positioned across an area in which the opening is formed and the other area of the one side.

4. The plasmonic optical waveguide according to claim 1, wherein the opening has a ridge, and the metal nano-particle is positioned on an imaginary line extended from the ridge.

5. The plasmonic optical waveguide according to claim 1, wherein the fixing means includes a dielectric layer formed on the one side of the nano-aperture, and the metal nano-particle is buried and fixed in the dielectric layer.

6. A plasmonic optical waveguide comprising:
   a nano-aperture formed with an opening of a nano-scale created by a light spot on one side;
   a metal nano-particle positioned on the one side on which the opening is formed and positioned at a position where the light spot of the nano-aperture is generated to generate plasmon coupling by interacting with the nano-aperture; and
   a fixing means formed on the one side of the nano-aperture to fix the metal nano-particle,
   wherein the fixing means is an insulation layer coated on the one side, and the metal nano-particle is buried in the insulation layer.

\* \* \* \* \*